Figure 1:
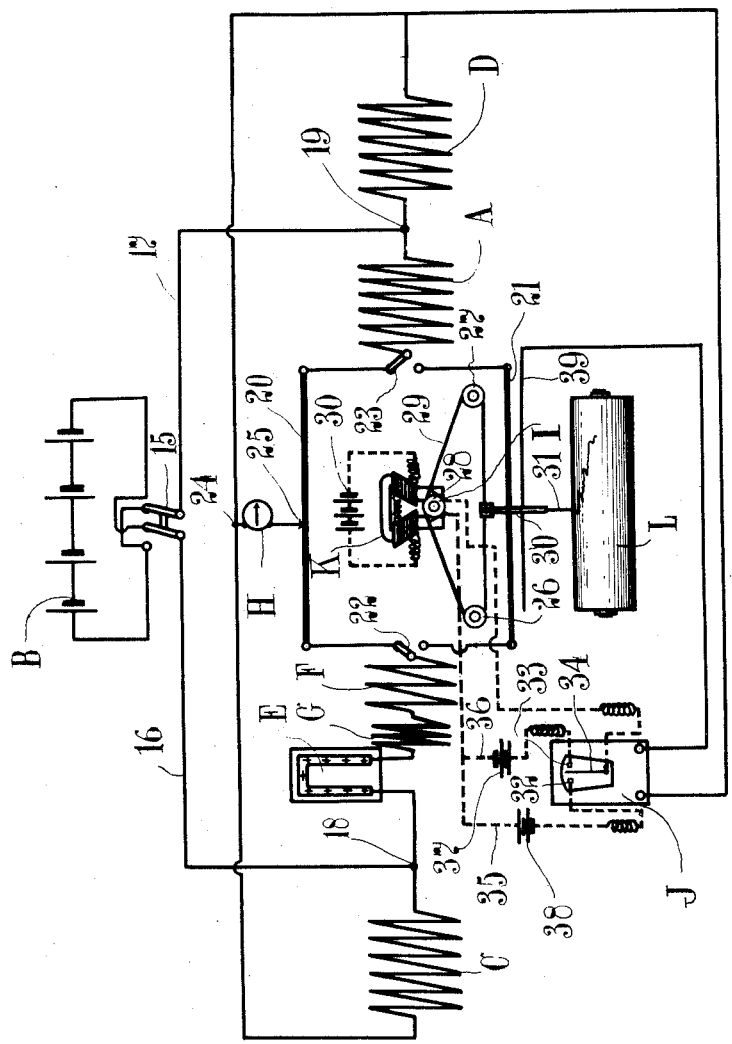

H. T. BARNES.
METHOD OF AND APPARATUS FOR RECORDING MARINE CONDITIONS.
APPLICATION FILED MAR. 6, 1911.

1,022,526.

Patented Apr. 9, 1912.
2 SHEETS—SHEET 1.

WITNESSES

INVENTOR
H.T. BARNES

BY [signature] ATTY.

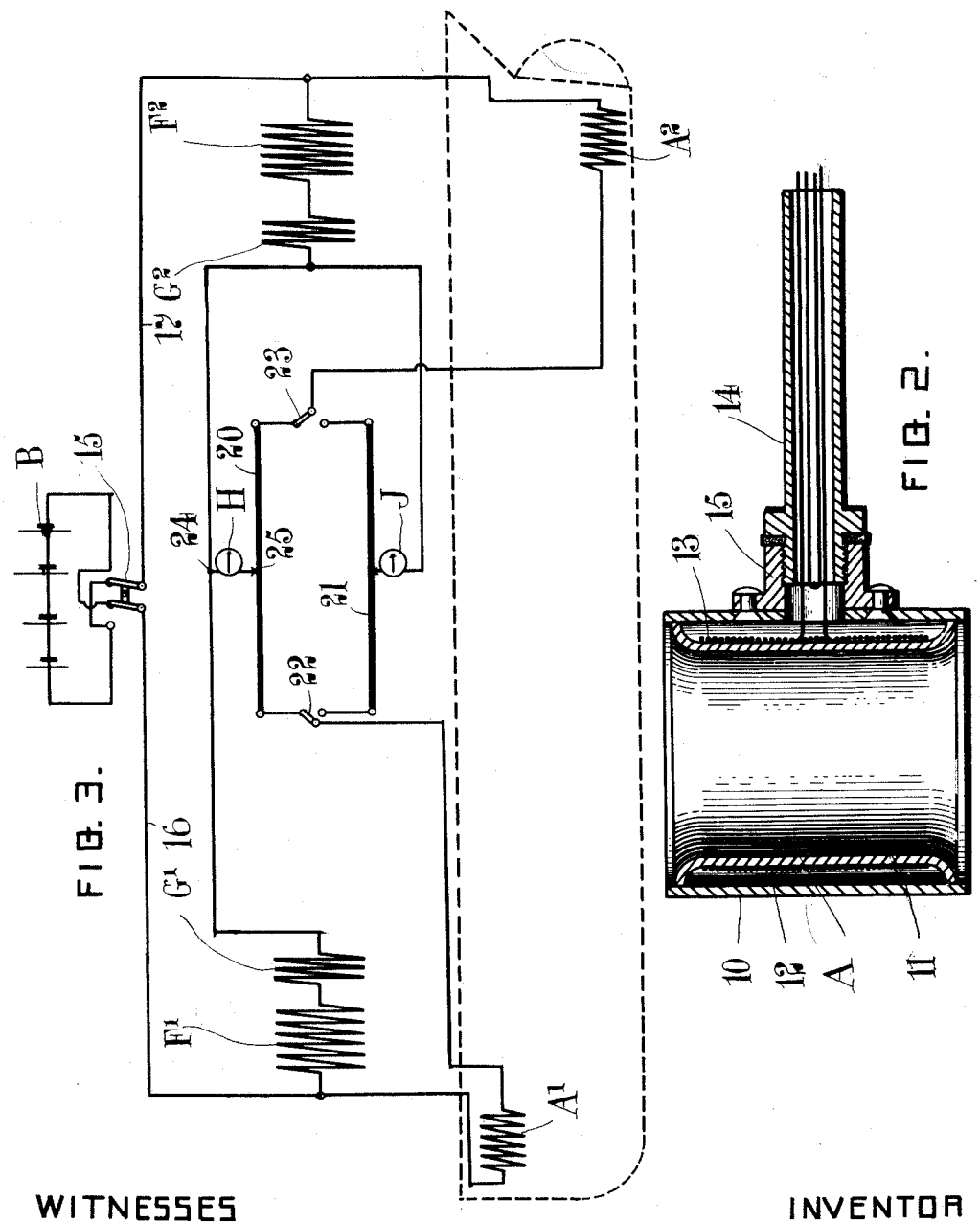

UNITED STATES PATENT OFFICE.

HOWARD TURNER BARNES, OF MONTREAL, QUEBEC, CANADA.

METHOD OF AND APPARATUS FOR RECORDING MARINE CONDITIONS.

1,022,526.　　　　　Specification of Letters Patent.　　Patented Apr. 9, 1912.

Application filed March 6, 1911.　Serial No. 612,623.

*To all whom it may concern:*

Be it known that I, HOWARD TURNER BARNES, a subject of the King of Great Britain, professor of physics, of McGill University, in Montreal, in the Province of Quebec, Dominion of Canada, have invented certain new and useful Improvements in Methods of and Apparatus for Recording Marine Conditions, of which the following is a specification.

My invention relates to improvements in method of, and apparatus for observing marine conditions and more particularly for the precise measurement of water temperature, with the object of ascertaining the presence of icebergs, shoals, and other causes of marine disturbances in the near vicinity of a vessel.

It has been theoretically suggested that the presence of icebergs might be detected by their cooling effect on the water, this cooling effect probably being produced by the current of cool and light fresh water running down from the iceberg, and spreading on the surface of the surrounding water. Very little practical use has been made of this suggestion, as navigators are divided in opinion as to its value, owing to the variable results obtained. Any data gathered to test the method has been by means of the ordinary drop bucket and thermometer, which could not read closer than one tenth of a degree. These readings were also taken a considerable distance apart owing to the speed of the ship, and as the temperature of the sea fluctuates independently of the ice, it will be seen that such readings would be of very little value.

With the method and apparatus presently to be described, it is possible to accurately read temperatures to one thousandth of a degree and to continually record such readings. Experimental data covered by this method and apparatus has revealed a curious and characteristic condition of the sea temperature in the vicinity of an iceberg, which was incapable of observation by the old methods. This is, that on approaching an iceberg, the temperature first slightly rises and then lowers—a characteristic fact which may be taken as an indication of the presence of ice and which can be due, as far as can be seen, to no other cause. The cause of the slight rise in the temperature is not clear—it may be due to temporary reaction at the juncture of the fresh surface current from the iceberg and the sea water—or it may be due to the presence or absence of definite organic life at said juncture. To observe this characteristic effect, it requires two conditions, provided by the present method and apparatus, namely: extremely accurate measurement of the temperature to within one thousandth of a degree, and the continuous recording of the measurement taken.

In the practical carrying out of the invention, an electric resistance thermometer is employed controlled by the sea temperature and connected to a resistance measuring apparatus which continuously records the fluctuations in resistance and consequently in temperature. A very convenient form of recording mechanism is the Callendar recording combined potentiometer and Wheatstone's bridge, such as manufactured by the Cambridge Scientific Instrument Co. Ltd. To adapt this instrument, however, to sea use, it is necessary to replace the suspension galvanometer by a Weston portable galvanometer relay or equivalent device which will not be affected by the motion of the ship.

A very convenient arrangement for the detection of icebergs is the provision of two thermometers measuring the temperatures at the surface and lower down, which thermometers may, if desired, be differentially connected so as to measure only differences in temperature. Where a difference in temperature exists between the two thermometers, it may be taken that it is due to some local causes such as icebergs.

The form of apparatus for carrying out the method is illustrated in the accompanying drawings, in which:

Figure 1 is a diagrammatic view of the apparatus. Fig. 2 is a sectional view of a form of thermometer which may be employed. Fig. 3 is a diagrammatic view of the connections when two thermometers are employed.

In the drawings like figures of reference indicate corresponding parts in each figure.

Referring first to Figs. 1 and 2 of the drawings, A represents the thermometer which is of the electric resistance type. I have found that greater stability in the operation of the thermometer can be secured if the resistance wire is formed of iron instead of the usual platinum. The form of thermometer illustrated, which is of course not essential to the method as a whole, is one which I have especially designed for the purpose. It includes concentric tubes 10 and 11 of heavy copper, the inner tube being flanged to form a space 12 between, within which the resistance coil 13 of the thermometer is located. This coil is of fairly large resistance in order to render fluctuations more readily perceptible. I have found one hundred ohms to be sufficient for this purpose. The connections from the resistance coil lead through a radially extending tube 14 which has screw threaded engagement with a connecting member 15 secured to the side of the tube 10 opposite an aperture therein. This thermometer is so placed as to be directly affected by sea temperature. For example it may be trailed through the water at a depth of a few feet below the surface. Otherwise it might be secured to the hull of the vessel below the water line.

According to the present invention, fluctuations in the resistance coil A are accurately measured and continuously recorded by apparatus located on the vessel. The ordinary Wheatstone's bridge method of measuring the resistance has been found to be the most satisfactory.

In the diagrammatic connection in Fig. 1, B represents the operating battery and 15 a reversing key for the same, from which conductors 16 and 17 lead to the junction points 18 and 19 of the resistances forming arms of the bridge. 20 and 21 represent two bridge wires which are adapted respectively for the observation of a single temperature, and for operation of the continuous recording mechanism in the manner hereinafter described, either one or the other of these bridge wires being thrown into circuit by means of switches 22 and 23. The arms of the Wheatstone bridge are constituted by resistance coils C and D each of resistance substantially equal to that of the thermometer coil A. The thermometer coil itself forms, with a portion of the bridge wire, the third arm of the bridge, while the fourth arm comprises the remaining portion of the bridge wire, a series of small resistances from one tenth to ten ohms, represented in the form of a resistance box E, a compensating wire F and a compensating coil G. The wire F is used to equalize the wire leading to the thermometer, wherever it may be placed, and comprises a loop of wire placed closely to the leads of the thermometer coil A and running side by side with them, whereby it will change equally in temperature with the said leads of the thermometer, and will therefore change equally in resistance, and, being connected to the opposite arms of the Wheatstone bridge, will not affect the balance point. The coil G is adapted to equalize the resistance of the thermometer at zero centigrade when contact is made with a suitable point of the scale on either of the bridges. H represents a portable galvanometer whose leads connect the junction point 24 with a sliding contact 25 on the bridge wire 20, the type of galvanometer being such that it will not be affected by the motion of the ship. I have found that a Weston portable galvanometer is suitable for this purpose. I represents, as a whole, a continuous recording mechanism for the fluctuations in the resistance, the type of instrument which I have found most convenient for this purpose being Callendar's record, combined potentimeter and Wheatstone bridge type, such as manufactured by the Cambridge Scientific Instrument Co. Ltd. The instrument is varied, however, from that manufactured by this company, by the substitution of a Weston portable galvanometer J for the suspension galvanometer and the use of the reversible motor K. However, this last is not essential. The recording mechanism includes pulleys 26, 27 and 28, over which a thread or cord 29 is stretched, the pulley 28 being adapted to be driven by a reversible motor K which has a separately excited field from a battery 30 and has an armature which may be rotated in either direction. The thread or cord 29 carries a sliding contact 30' mounted on the bridge wire 20 and carrying a pen 31 adapted to make a record on a recording drum or sheet L. The galvanometer J is provided with contacts 32 and 33 against which the extremity of the handle 34 is adapted to press when deflected on either side, and so complete either of the two circuits 35 and 36 which are adapted to send current through the armature in opposite directions and so effect a reversal thereof, the circuit 36 including the battery 37 and the circuit 35 including the battery 38. The galvanometer J is connected between the junction point 24 and a wire 39 which parallels the bridge wire 21 and is adapted to be connected thereto by the sliding contact 30'. It will thus be seen that when the galvanometer is, for example, deflected to the left, contact at 32 is made and the battery 38 sends a current through the armature which rotates in such a direction as to pull the contact 30' to a position which will establish the balance on the bridge wire again, and bring the galvanometer needle to undeflected position. When the needle is deflected to the right, contact with 33 is made and the battery 37 is set in operation causing the motor to reverse and drawing the contact 30' over to the other direction on the bridge wire, and so restores the balance. In the operation of this part of the invention as a whole, the thermometer A is carried to any distance where it is required to measure the temperature, provided a similar length of compensating wire F is run. For instance, the thermometer may be fixed over the side of the ship and trailed through the water at a distance of a few feet below the surface, the wires passing through a suitable inclosing and protecting covering, such as copper and lead tubing. The resistances in the box E are then adjusted so as to enable the fluctuations in temperature to be measured on the bridge wire, the large changes in temperature being taken care of by changes in the resistance box E. As the thermometer is designed principally to measure extremely small changes in temperature, the principal use of the resistances will be when working in water of different degrees of temperature. The switches 22 and 23 enable either of the bridge wires 20 or 21 to be thrown into circuit, the bridge wire 21 permitting the separate reading to be made on the galvanometer H, while the bridge wire 20 continuously records the reading, the scales on the chart or drum being made to correspond.

In Fig. 3 a form of apparatus is illustrated particularly useful for the detection of the presence of icebergs and in which two thermometers A' and A² are connected differentially, the former being located a short distance below the surface and the latter as deep down as it is possible to place it, the object being to cause one thermometer to be affected by the light surface currents and particularly by the currents of fresh water flowing from an iceberg, while the lower thermometer will measure the temperature of the ordinary sea water, which will vary only slightly. The general arrangement of the connection of the two thermometers is the same, two opposite arms of the bridge being formed by the thermometer coils A' and A² respectively, while the other two arms are formed by compensating coils F' and F² respectively and compensating wires G' and G² respectively. In this way the galvanometer will be deflected by any difference in resistance between the thermometers.

With the apparatus above described it is possible to accurately and continuously register temperatures to one thousandth of a degree and to make registration when the ship is going at full speed. As before stated, it is only with such accurate and continuous measurements that the peculiar conditions present in the water when approaching an iceberg, namely a slightly raised temperature followed by a rapidly decreased temperature, can be noted. The method and apparatus are also useful for a variety of other purposes. For instance, in hydrographic work, boundaries of currents and their variations of position with tides, seasons and the like can easily be worked out from a series of continuous temperature records of the type described. It has also been found that shoals, and the proximity of land appear to produce disturbances in temperature, which can be detected by the present apparatus.

As many changes could be made in the above construction and many apparently widely different embodiments of my invention, within the scope of the claim, constructed without departing from the spirit or scope thereof, it is intended that all matter contained in the accompanying specifications and drawings shall be interpreted as illustrative and not in a limiting sense.

What I claim as my invention is:

The method of determining the proximity of icebergs, etc., at sea, which consists in immersing in the water a thermometer getting an accurate record of the readings of said thermometer and deducing from certain peculiarities of said record the proximity of such icebergs, etc.

In witness whereof I have hereunto set my hand in the presence of two witnesses.

HOWARD TURNER BARNES.

Witnesses:
CHAS. F. DICKERSON,
CHAS. ISAACS.